US009377951B2

(12) United States Patent
Griffin (10) Patent No.: US 9,377,951 B2
(45) Date of Patent: *Jun. 28, 2016

(54) HANDHELD ELECTRONIC DEVICE PROVIDING CONFIRMATION OF INPUT, AND ASSOCIATED METHOD (71) Applicant: BlackBerry Limited, Waterloo (CA)

(72) Inventor: Jason Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 397 days.

This patent is subject to a terminal disclaimer.

(21) Appl. No.: 13/897,009

(22) Filed: May 17, 2013

(65) Prior Publication Data

US 2013/0249805 A1 Sep. 26, 2013

Related U.S. Application Data (63) Continuation of application No. 13/346,359, filed on Jan. 9, 2012, now Pat. No. 8,466,812, which is a continuation of application No. 11/617,877, filed on Dec. 29, 2006, now Pat. No. 8,115,658.

(51) Int. Cl.
*G06F 3/023* (2006.01)
*G06F 3/0488* (2013.01)
(52) U.S. Cl.
CPC .......... *G06F 3/04886* (2013.01); *G06F 3/0237* (2013.01)
(58) Field of Classification Search
CPC ................ G06F 3/04886; G06F 3/0237
USPC .......... 341/20–22; 704/10, 533; 345/168, 352
See application file for complete search history.

(56) References Cited

U.S. PATENT DOCUMENTS

| 5,818,437 A | 10/1998 | Grover et al. |
| 5,953,541 A | 9/1999 | King et al. |
| 5,963,671 A * | 10/1999 | Comerford ........... G06F 3/0237 345/168 |
| 6,094,197 A * | 7/2000 | Buxton ................. G06F 3/0482 341/22 |
| 6,307,548 B1 | 10/2001 | Flinchem et al. |
| 6,573,844 B1 | 6/2003 | Venolia et al. |
| 6,646,572 B1 * | 11/2003 | Brand ................... G06F 3/0219 341/22 |
| 7,098,896 B2 * | 8/2006 | Kushler ............. G06F 3/04886 345/168 |

(Continued)

FOREIGN PATENT DOCUMENTS

| DE | 10 2004 041895 A1 | 3/2006 |
| WO | 98/33111 A1 | 7/1998 |
| WO | 00/74240 A | 12/2000 |

OTHER PUBLICATIONS

Office Action from the Canadian Intellectual Property Office mailed Dec. 10, 2010 in co-pending application No. 3,616,519 (3 pages).

(Continued)

*Primary Examiner* — Albert Wong
(74) *Attorney, Agent, or Firm* — Fish & Richardson P.C.

(57) ABSTRACT

A letter confirmation system is provided on a handheld electronic device. The letter confirmation provides highlighting of various letters that have been input to the handheld electronic device during a string of member input actuations. The letter confirmation system can additionally provide predictive linguistic elements that would be appropriate next inputs. Various types of highlights can be provided in various combinations to provide various indications to a user.

24 Claims, 8 Drawing Sheets

(56) References Cited

U.S. PATENT DOCUMENTS

| | | | |
|---|---|---|---|
| 7,250,938 B2 * | 7/2007 | Kirkland | G06F 3/04886 345/156 |
| 7,443,316 B2 * | 10/2008 | Lim | G06F 3/0237 341/22 |
| 7,610,194 B2 | 10/2009 | Bradford et al. | |
| 7,681,145 B1 | 3/2010 | Pu | |
| 7,761,175 B2 | 7/2010 | Gutowitz et al. | |
| 8,044,827 B2 * | 10/2011 | Jarczyk | G06F 3/04883 341/22 |
| 8,115,658 B2 | 2/2012 | Griffin | |
| 8,466,812 B2 | 6/2013 | Griffin | |
| 2004/0046746 A1 | 3/2004 | Monson | |
| 2005/0144566 A1 | 6/2005 | Zhang | |
| 2005/0283358 A1 | 12/2005 | Stephanick et al. | |
| 2007/0200827 A1 | 8/2007 | Samal | |
| 2008/0158020 A1 | 7/2008 | Griffin | |
| 2012/0105352 A1 | 5/2012 | Griffin | |

OTHER PUBLICATIONS

Sears, A., "Improving Touchscreen Keyboards: Design Issues and a Comparison with other Devices," Human Computer Interaction Laboratory, Department of Computer Science University of Maryland, College Park, MD, Mar. 11, 1991, pp. 1-18 (18 pages).

Office Action from the Canadian Intellectual Property Office mailed Oct. 14, 2011, 2,616,519, 2 pages.

Extended European Search Report in Application No. 06127344.7, dated May 23, 2007, 9 pages.

European Office Action in Application No. 06127344.7, dated Sep. 30, 2008, 14 pages.

European Office Action in Application No. 06127344.7, dated Feb. 17, 2010, 5 pages.

\* cited by examiner

HANDHELD ELECTRONIC DEVICE PROVIDING CONFIRMATION OF INPUT, AND ASSOCIATED METHOD

BACKGROUND

1. Field

The disclosed and claimed concept relates generally to handheld electronic devices and, more particularly, to a handheld electronic device that provides a confirmation of a linguistic input.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature a wireless communication capability, although many such handheld electronic devices are stand-alone devices that are functional without communication with other devices.

Due to the small size of many handheld electronic devices, and due to the fact that users of handheld electronic devices typically can devote only a limited amount of attention to operating the device, as well as other factors, a user's operation of a handheld electronic device typically is prone to mistakes. The situation is exacerbated in the case of text input on a handheld electronic device when an input device such as a keypad is physically separated and/or spaced from an output device such as a display, which is often the case. That is, a user entering text using a keypad oftentimes must shift his or her attention from the keypad to the display in order to confirm that the intended input was actually correctly input into the handheld electronic device. Such a shifting in attention is particularly problematic since, as mentioned above, a user typically can devote only a limited amount of attention to a handheld electronic device, such as when the user is trying to carry on a conversation with another person or is operating another device while using the handheld electronic device. It thus would be desired to provide an improved handheld electronic device and method that overcome these and other shortcomings.

BRIEF DESCRIPTION OF THE DRAWING

A full understanding of the disclosed and claimed concept can be gained from the following Description when read in conjunction with the accompanying drawings in which:

Similar numerals refer to similar parts throughout the specification.

DESCRIPTION

Figure 1:
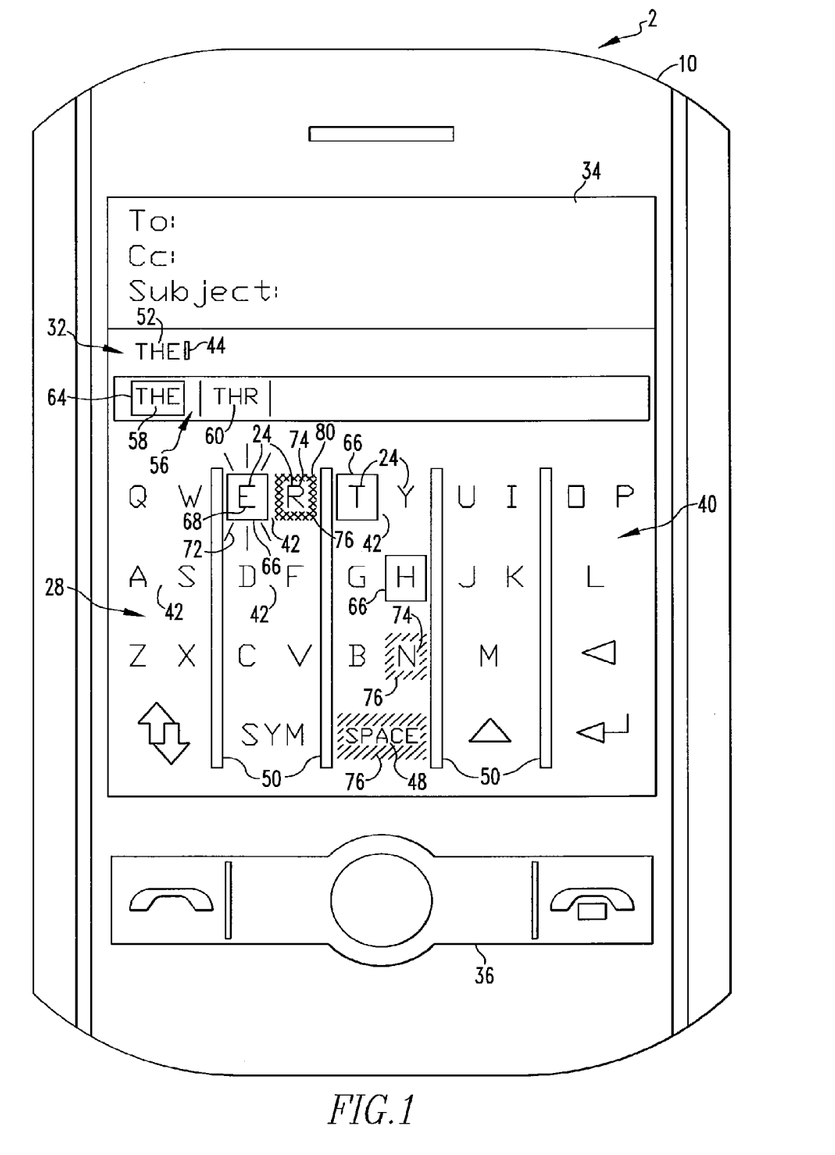
FIG. 1 is a front elevational view of an improved handheld electronic device in accordance with the disclosed and claimed concept after a first string of input member actuations.
Figure 2:
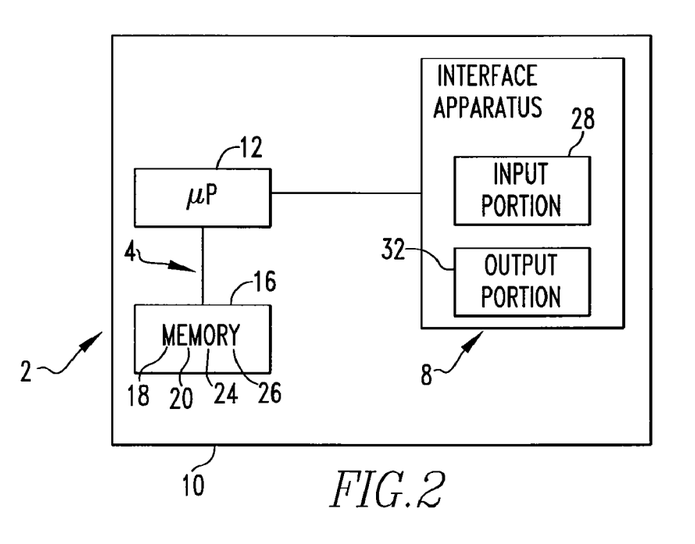
FIG. 2 is a schematic depiction of the handheld electronic device of FIG. 1.

An improved handheld electronic device 2 in accordance with the disclosed and claimed concept is depicted generally in FIGS. 1 and 3-6 and is depicted schematically in FIG. 2. The handheld electronic device 2 comprises a processor apparatus 4 and an interface apparatus 8 disposed on a housing 10.

The processor apparatus 4 comprises a processor 12 and a memory 16 in electronic communication. The processor 12 can be any of a wide variety of processors such as, without limitation, a microprocessor (µP) that is responsive to input from the interface apparatus 8 and that provides output signals to the interface apparatus 8. The memory 16 can be any of a wide variety of memory structures such as, without limitation, RAM, ROM, EPROM, EEPROM, FLASH, and/or other memory structures that function in a fashion similar to an internal storage area of a computer and that can be either volatile or nonvolatile.

The memory 16 has stored therein a plurality of language objects 18 and a plurality of frequency objects 20. The language objects 18 are generally each in the form of a word in the described exemplary embodiment, and each comprise a number of linguistic elements that are also stored in the memory 16. As employed herein, the expression "a number of" and variations thereof shall refer broadly to any nonzero quantity, including a quantity of one. The linguistic elements are, in the present exemplary embodiment, in the form of Latin letters 24. Each language object 18 is associated with a frequency object 20, and the associated frequency object 20 has a frequency value which, in the present exemplary embodiment, is indicative of the relative frequency with which the particular language object 18 appears in a given linguistic corpus.

The memory 16 additionally has stored therein a number of routines 26, including a disambiguation routine 26. The routines 26 are executable by the processor 12 and can be in the nature of software, firmware, and the like, for example and without limitation.

The interface apparatus 8 can be said to comprise an input portion 28 and an output portion 32. In the present exemplary embodiment, the interface apparatus 8 comprises a touch screen 34 and a navigation keypad 36. The input portion 28 can be said to comprise a detecting component of the touch screen 34 and the navigation keypad 36. For instance, the detecting component is structured to detect a touch actuation or other type of physical interaction with the touch screen 34 and to provide an input to the processor apparatus 4 in a known fashion. The output portion 32 can be said to comprise a display component of the touch screen 34.

The input portion 28 of the touch screen 34 can be said to be a region of the touch screen 34 where a user can provide linguistic input to the processor apparatus 4 by interacting with the touch screen 34. The input portion 28 comprises a virtual keypad 40 comprising a plurality of virtual keys 42 on the touch screen 34. More specifically, each virtual key 42 can be said to comprise a particular region of the touch screen 34 that is touch actuatable or can receive another physical interaction that is detectable by the detecting component to provide an input to the processor apparatus 4. Each such virtual key 42 has a number of the letters 24 assigned thereto, with most having two letters 24 assigned thereto. For instance, one of the virtual keys 42 has the letters 24 <TY> assigned thereto, and another virtual key 42 has the letters 24 <ER> assigned thereto. The letters 24 that are assigned to any particular visual key 42 are depicted by the display component of the touch screen 34 in the vicinity of the input portion 28.

The virtual keypad 40 further includes a <SPACE> key 48 that is actuatable to provide a finalization input to the processor apparatus 4 and to insert a <SPACE> into text. In one exemplary embodiment, such a finalization input results in the outputting of a word at a text input location in the output portion 32 and a clearing of a stored string of input member actuations. The virtual keys 42, the <SPACE> key 48, and other keys in the virtual keypad 40 each comprise an input member that is actuatable to provide an input to the processor apparatus 4. The virtual keys 42 can each be said to constitute a linguistic input member.

In the exemplary embodiment depicted herein, many of the virtual keys 42 each have a plurality of the letters 24 assigned thereto. An actuation of a particular virtual key 42 is an input member actuation which begins or is added to a string of input member actuations. The letters 24 of the virtual keys 42 of such a string of input member actuations are used by the disambiguation routine 26 to identify one or more language objects 18 that correspond with the input, i.e., the string of input member actuations. That is, a language object 18 can be said to correspond with an input, i.e., a string of input member actuations, if the letters 24 of at least an initial portion of the language object 18 are sequentially consistent with a possible permutation of the letters 24 assigned to the virtual keys 42 that were actuated to form the string of input member actuations.

Since many of the virtual keys 42 have a plurality of the letters 24 assigned thereto, and an actuation of any such virtual key 42 could be intended by a user to be an input of any one of the letters 24 assigned to such key 42, the virtual keypad 40 can be said to be in the form of a reduced keyboard. The exemplary arrangement of the letters 24 is that of a QWERTY format, and the virtual keypad 40 thus can be said to be a reduced QWERTY keyboard. It is noted, however, that the teachings herein can be employed in conjunction with arrangement of the letters 24 other than in a QWERTY or reduced QWERTY format. Moreover, it is noted that the virtual keypad 40 need not be virtual in nature provided by a touch screen 34, and instead could be provided in the form of a mechanical or other type of keyboard without departing from the present concept.

The display component of the touch screen 34 additionally displays in the input portion 28 a plurality of elongated separators 50 disposed between adjacent columns of the virtual keys 42. As such, the exemplary virtual key 42 <DF> is the region of the detecting component of the touch screen 34 that extends horizontally (from the perspective of FIG. 1) between one pair of adjacent separators 50 and extends vertically between the virtual key 42 <ER> and the vertical key 42 <CV>. Moreover, the display component of the touch screen 34 provides in the output portion 32 a text input component 52 and a variant component 56. During text entry, the exemplary disambiguation routine 26 operates by identifying one or more language objects 18 that correspond with a string of input member actuations. One of the identified language objects 18 is identified as being a default language object 18. In the depicted exemplary embodiment, the default language object 18 typically will be the identified language object 18 having associated therewith the frequency object 20 having the relatively highest frequency value from among the frequency objects 20 of the other identified language objects 18. More language objects 18 than merely the default language output 18 typically are identified by the disambiguation routine 26, although this need not always be the case.

An initial portion of the default language object 18 identified for a string of member input actuations is output as a default output 58 within the variant component 56. Initial portions of one or more other identified language objects 18, if any, may be output as variant outputs 60 within the variant component 56. A selection box 64 surrounds or otherwise highlights the default output 58. The default output 58 additionally is output at the text input component 52 at the location of a cursor 44. The cursor 44 indicates a location on the output portion 32 where additional text will be output responsive to another input member actuation. It is noted that the selection box 64 can be shifted by the user to one of the variant outputs 60 if such variant output 60 is the output intended by the user as a result of a string of input member actuations. In this regard, it is understood that the default output 58 is at least an initial portion of the identified language object 18 having the highest frequency value, and it is further understood that the variant outputs 60 are initial portions of other identified language objects 18 that are output in order of decreasing frequency value of the frequency objects 20 associated therewith.

The handheld electronic device 2 advantageously provides a letter confirmation system that provides highlighting in the input portion 28 of various letters 24 of virtual keys 42 that have been actuated during a text input procedure. The letter confirmation system can also be said to provide a predictive feature whereby one or more letters 24 can be highlighted in the input portion 28 as each being a predictive linguistic element that would constitute valid textual addition immediately following an entered string of input member actuations.

FIG. 1 depicts an exemplary output on the touch screen 34 responsive to a string of actuations of the virtual keys 42 <TY> <GH> <ER>. A language object 18 corresponding with the word "the" has been identified as corresponding with the string of member input actuations and as having the highest frequency value associated therewith. In this regard, it is noted that in certain circumstances an identified language object 18 that corresponds with a string of input member actuations and that has a quantity of letters 24 equal to the quantity of input member actuations may be identified as the default language object 18 despite other identified language objects 18 that have relatively higher frequency values associated therewith but that have more letters 24 than the number of input member actuations in the string.

As can be seen from FIG. 1, the letters 24 assigned to the virtual keys 42 that were actuated in inputting the string of input member actuations of FIG. 1 and that are consistent with the initial letters 24 of the default output 58 are highlighted in the input portion 28 with a first highlighting 66. The exemplary first highlighting 66 is depicted as being a box drawn around a letter 24. The exemplary first highlighting 66 is indicative of each such highlighted letter 24 being considered by the disambiguation routine 26 to be the default accepted letter 24 interpretation of the actuation of the virtual key 42 to which such letter 24 is assigned.

The letter 24 that is assigned to the virtual key 42 of the most recent input member actuation, i.e., the current input member actuation, and that is consistent with a sequentially correspondingly positioned letter 24 in the default output 58, i.e., the final letter 24 of the default output 58, is considered to be a current linguistic element 68 which, in FIG. 1, is the letter 24 "E". In order to further bring the current linguistic element 68 to the attention of the user, the current linguistic element 68 additionally has second highlighting 72 applied thereto in the exemplary form of a relatively greater degree of brightness than the other letters 24 as highlighted with the first highlight 66 in the input portion 28.

In this regard, such a brightening can be accomplished directly, such as by increasing the brightness of the current linguistic element 68 on the touch screen 34, or indirectly, such as by decreasing the brightness of all of the elements on the touch screen 34 other than the current linguistic element 68. For instance, if the display component of the touch screen 34 is an LCD screen, the indirect approach to increasing the brightness of the current linguistic element 68 might be required since LCDs are known to have limitations regarding increasing the brightness thereof. As such, depending upon the capabilities of the display component, the exemplary relatively greater degree of brightness might instead be provided by an altered color of the current linguistic element 68 and/or a thicker box of first highlighting 66 around the current linguistic element 68 and/or a pulsing of the current linguistic element 68, for example.

It can be seen that the letter "E" in FIG. 1 has two different types of highlighting applied thereto simultaneously, i.e., the first highlighting 66 and the second highlighting 72. Other letters 24 in the input portion 28 have no highlighting applied thereto. In the example depicted in FIG. 1, the first highlighting 66 confirms to a user the letters 24 of the default interpretation of a series of input member actuations without requiring the user to look at the output portion 32. The second highlighting 72 serves to identify to the user the letter 24 that is the current linguistic element 68, i.e., the preferred letter 24 of the most recently actuated virtual key 42. Such dual highlighting advantageously helps to inform the user of the currently proposed default interpretation of a string of actuations of virtual keys 42, and further provides to the user a confirmation of the most recently input letter 24 to mentally assist the user in inputting additional letters 24.

It is further noted from FIG. 1 that the letters 24 "R" and "N" are highlighted with third highlighting 76 to indicate that such letters 24 are predictive linguistic elements 74. Such third highlighting 76 is depicted in the exemplary form of angled hatching and is indicative of what would be an appropriate immediately next input. For instance, the letter 24 "N" is provided as a predictive linguistic element 74 to help the user enter, for instance, the word "then" by actuating the key 42 <BN> immediately after the string of input member actuations <TY> <GH> <ER>. The letter 24 "R" is provided as a predictive linguistic element 74 in the event that the user wanted to enter the word "there", which could be partially accomplished by actuating the virtual key 42 <ER> immediately after the string of input member actuations <TY> <GH> <ER>. Such predictive linguistic elements 74 can be identified from the language objects 18 in the memory 16. It thus can be seen that the predictive linguistic elements 74 are provided as indications of the next virtual keys 42 that can be actuated in order to input particular language objects 18.

It is noted that the <SPACE> key 48 has likewise received third highlighting 76 in order to indicate that its actuation would likewise be appropriate immediately after the series of actuations of the virtual keys 42 <TY> <GH> <ER>. That is, the default output 58 "the" is itself a complete word, and an actuation of the <SPACE> key 48 would provide a finalization input that would accept the default output 58, would output the default 58 as a completed word in the text input component 52, and would clear the existing stored string of input member actuations in order to make way for future input member actuations of another text input.

As can further be seen from FIG. 1, the letter 24 "R" additionally has fourth highlighting 80 applied thereto. Such fourth highlighting 80 is depicted in the form of angled hatching and is indicative of the predictive linguistic element 74 "R" having a relatively higher priority or frequency value than the predictive linguistic element 74 "N". That is, the letter 24 "R" is output as a predictive linguistic element 74 that is relatively more likely to be intended by the user than the letter 24 "N". Such a determination can be made from the language object 80 and/or the frequency objects 20 in the memory 16.

As mentioned above, the fourth highlighting 80 is represented herein by the exemplary angled hatching in FIG. 1. The exemplary third highlighting 76 is represented herein by the exemplary angled hatching oriented in a different direction than the hatching of the fourth highlighting 80. It is noted that the exemplary representation of the third and fourth highlightings 76 and 80 as being angled hatchings are intended to be merely illustrative of two different types of highlighting that can be employed to highlight the various letters 24 in the input portion 28. The same can be said for the exemplary first highlighting 66, which is represented herein by the exemplary box, and the second highlighting 72, which is in the exemplary form of a higher degree of brightness and is represented herein by the exemplary radially extending brightness lines. The same can be further said about fifth highlighting 82 that will be described in greater detail below.

That is, numerous different types of highlighting of letters 24 can be envisioned. For instance, some of the types of usable highlighting would comprise highlighting based upon brightness, size, color, contrast, objects such as circles and boxes surrounding the letters 24, bolding of fonts, italicization or other alteration of fonts, underlining of characters, and other types of highlighting, any one or more of which can be provided alone or in various combinations. In a mechanical keyboard, various types of lighting such as electroluminescent lighting or other backlighting can be employed. It thus is noted that the exemplary types of highlighting depicted and described herein are exemplary only and are not intended to be limiting.

Figure 3:
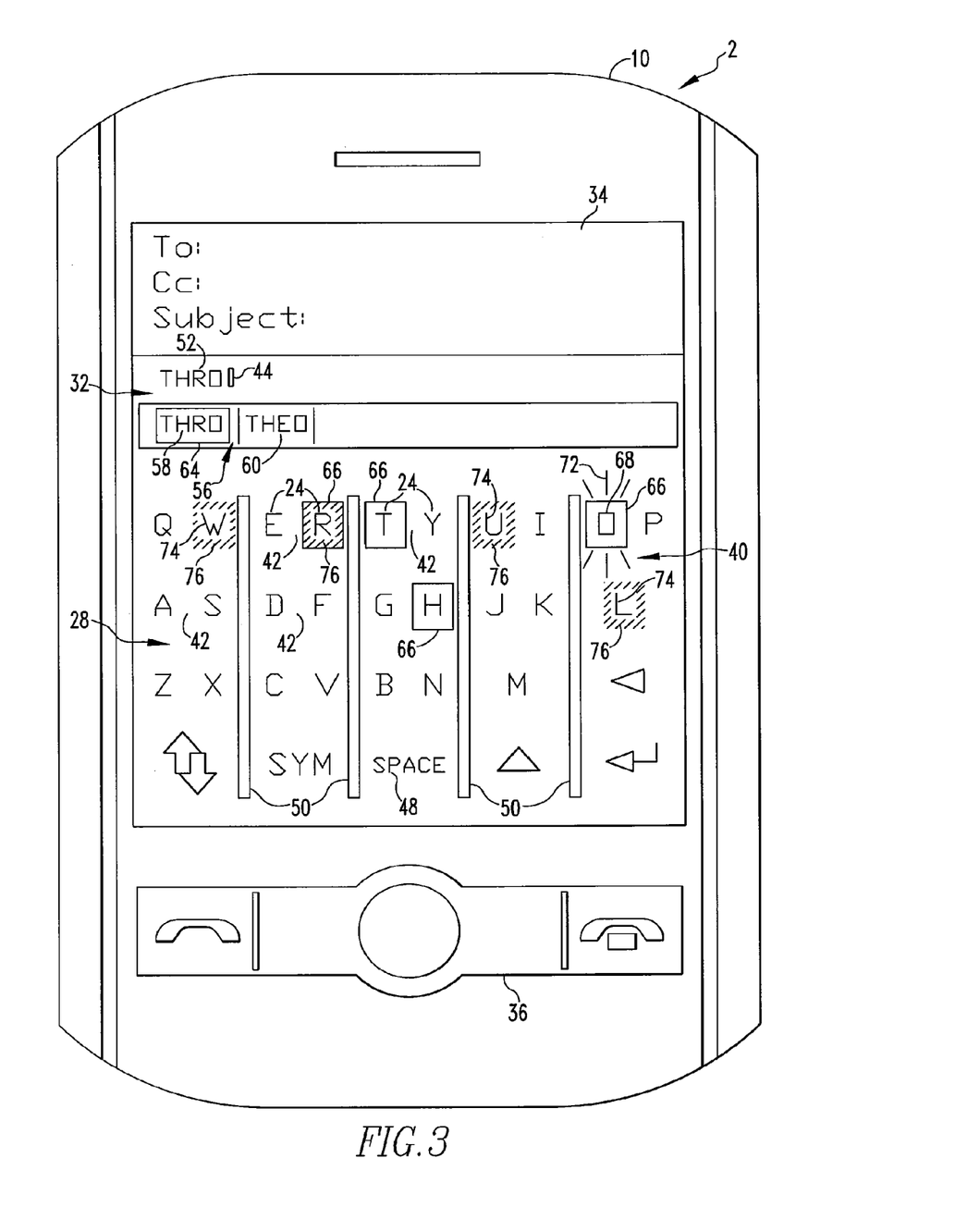
FIG. 3 is a view similar to FIG. 1, except depicting the handheld electronic device after an additional input member actuation.

FIG. 3 depicts the handheld electronic device 2 of FIG. 1, except after the additional actuation of the virtual key 42 <OP> immediately after the actuations of the string of virtual keys 42 <TY> <GH> <ER>. Since the default output 58 is now "thro", such as might be an initial portion of the language object 18 corresponding with the word "through", the letters 24 "T" "H" "R" and "O" have received first highlighting 66 as being indicative of the default input path. As such the letter 24 "R" in FIG. 3 has received the first highlighting 66 that had previously been applied to the letter 24 "E" in FIG. 1 where it had represented that the letter 24 "E" of the actuated virtual key 42 <ER> was considered to be a part of the default input path thereof, as was indicated by the default output 58 thereof. As such, it can be seen that if the default language object 18 changes during the course of a string of input member actuations, the highlighting in the input portion 28 of the various letters 24 can likewise change.

The letter 24 "R" in FIG. 3 additionally has third highlighting 76, applied thereto to indicate that the letter 24 "R" is a predictive linguistic element 74, such as for the language object 18 "theory". Similarly, the letter 24 "L" has third highlighting 76 applied thereto to indicate that the letter 24 "L" is a predictive linguistic element 74, such as for the language object 18 "theology". It thus can be seen that the identified predictive linguistic elements 74 need not be limited to those that follow the currently highlighted default input path, and rather can enable the user to enter text along a different path than is currently highlighted.

Figure 3A:
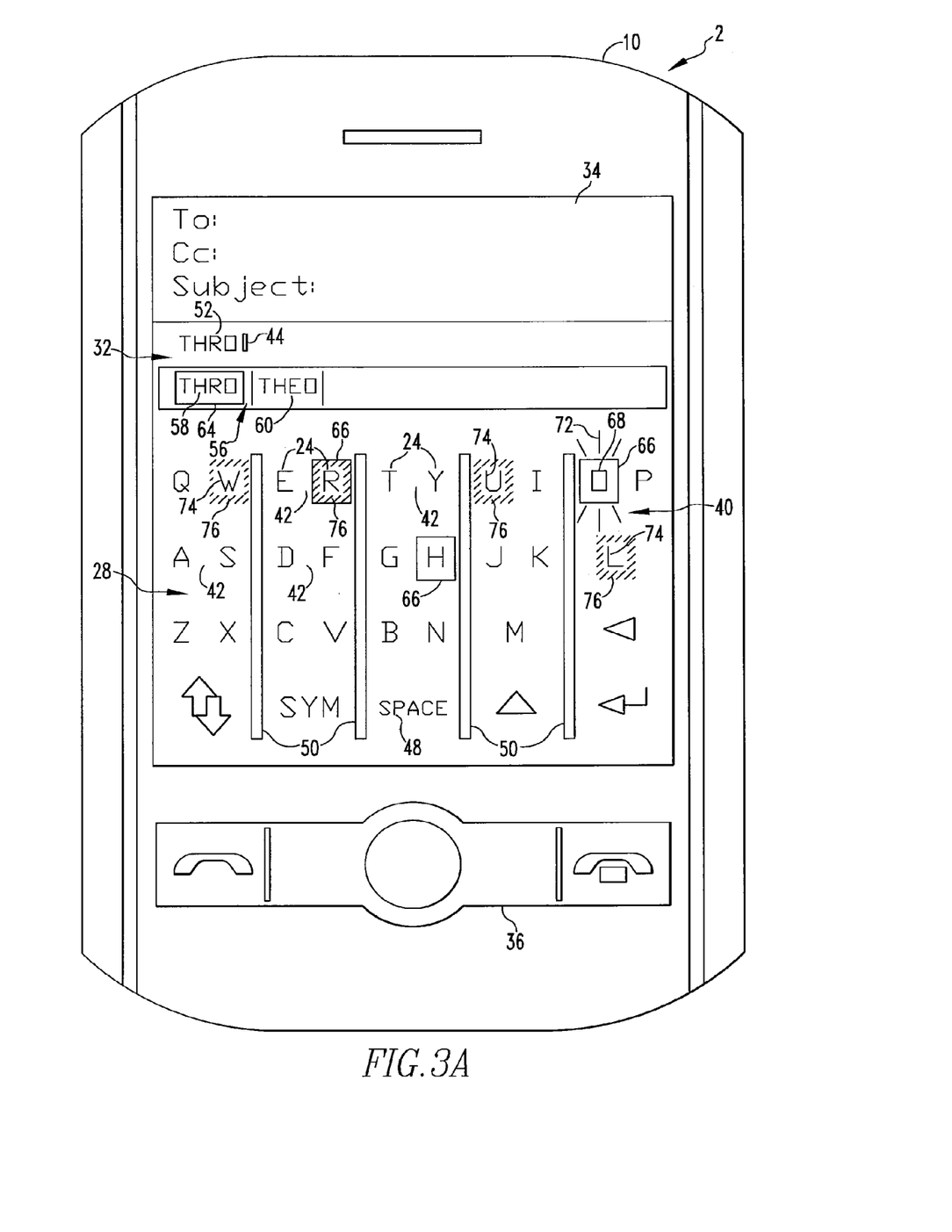
FIG. 3A is a view similar to FIG. 3, except depicting an additional feature on the handheld electronic device.

FIG. 3A is similar to FIG. 3 but depicts the letter 24 "T" as being unhighlighted even though it is the first letter 24 of the current default output 58 of FIG. 3. Such an absence of highlighting of the letter 24 "T" is indicative of any of a number of optional features that can be provided on the handheld electronic device 2. For instance, the handheld electronic device 2 may be configured such that only a certain number of current and immediately preceding letters 24 of the default output 58 receive first highlighting 66. That is, the letter 24 "T" may have become unhighlighted upon actuation of the virtual key 42 <OP>. This may be provided in order to avoid cluttering the input portion 28 with too many of the letters 24 being highlighted or for other purposes. Alternatively, the handheld electronic device 24 may be configured such that certain of the first highlighting 66 disappears depending upon a rhythm of typing by the user. For instance, as the frequency of input member actuations increases, the duration of time during which a letter 24 of the default output 58 retains its first highlighting 66 decreases. In such a situation, FIG. 3A could be said to represent a situation wherein the user was typing with a faster rhythm than the rhythm with which the user was typing in FIG. 3.

A similar feature can be provided by altering the highlighting from an initial highlighting to a default highlighting in response to certain events. For instance, the second highlighting 72 could be altered from such second highlighting 72, i.e., an initial highlighting, to an absence of such highlighting or to a different highlighting, i.e., a default highlighting, after a certain duration of time or after an actuation of another virtual key 42. For example, it can be seen between FIG. 1 and FIG. 3 that the second highlighting 72 applied to the letter 24 "E" has changed in FIG. 3 to an absence of the second highlighting 72. Such an absence of highlighting or a different highlight could be provided as a default highlight. It is noted for the sake of completeness that in FIG. 3 the letter 24 "E" is depicted as being devoid of any highlighting whatsoever. That is, the first highlighting 66 has likewise been removed therefrom. It is noted that with a different virtual key 42 actuation the second highlighting 72 that had been applied to the letter 24 "E" in FIG. 1 could have changed from its initial highlighting in FIG. 1 to its default highlighting in FIG. 3, i.e., an absence of the second highlighting 72, without also removing the first highlighting 66.

Figure 4:
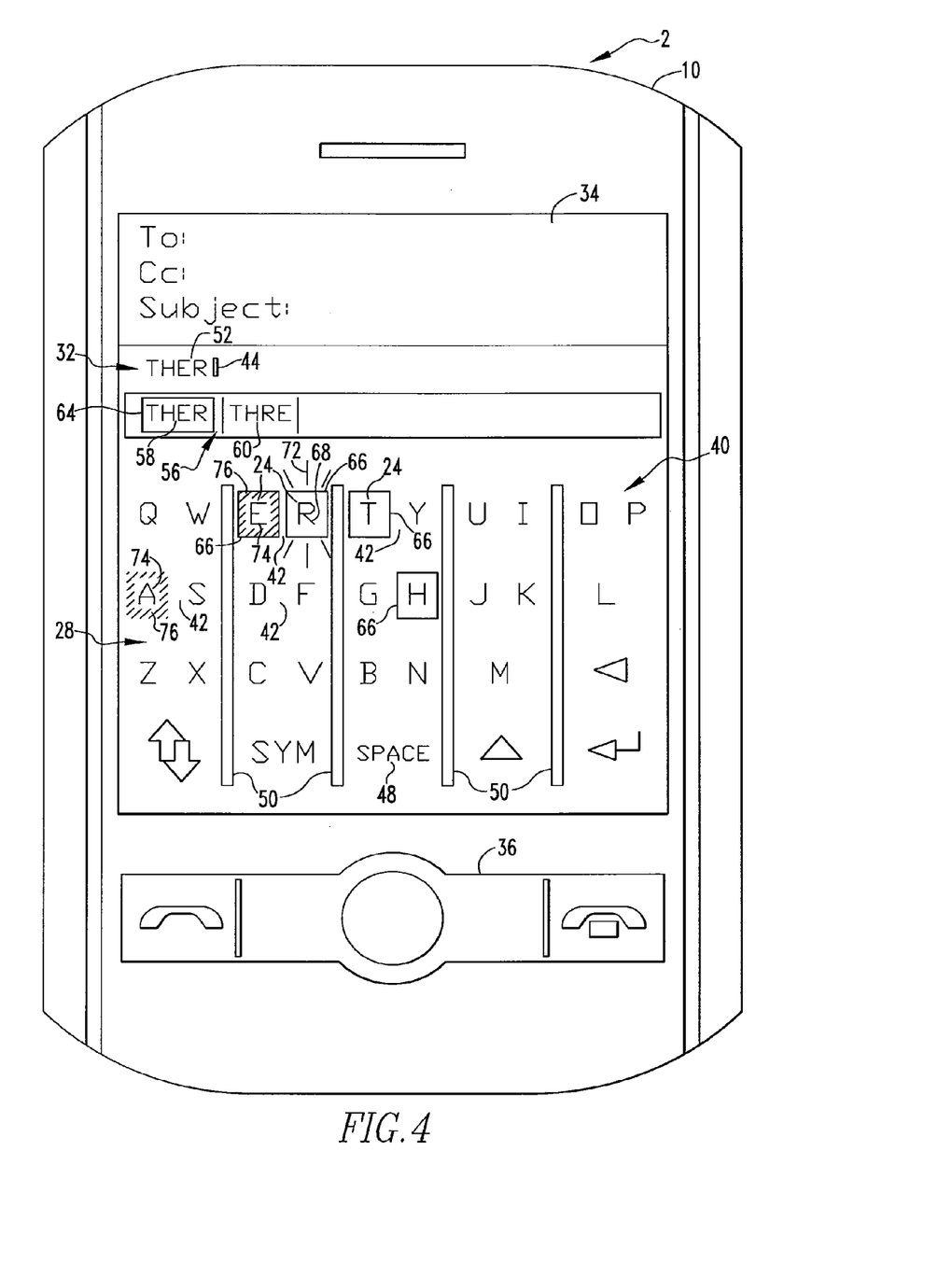
FIG. 4 is a view similar to FIG. 1, except depicting the handheld electronic device after an additional input member actuation.

FIG. 4 is a view similar to FIG. 1 except depicting as an additional input member actuation an actuation of the virtual key 42 <ER> immediately after the series of actuations of the virtual keys 42 <TY> <GH> <ER>. Since in FIG. 4 the default output 58 is "ther", such as might correspond with the language object 18 representative of the word "there", the letter 24 "R" is now the current linguistic element 68 in FIG. 4 and thus has both the first and second highlightings 66 and 72 applied thereto. The letter 24 "E" is no longer the current linguistic element, and thus it no longer has the second highlighting 72 applied thereto, although it retains its first highlighting 66 since it remains a part of the default output 58 of FIG. 4. It is noted that the letter 24 "E" in FIG. 4 additionally has the third highlighting 76 applied thereto since such letter is now a predictive linguistic element 74 in FIG. 4, such as would indicate that the next input letter 24 appropriately could be the letter 24 "E" by actuating the virtual key 42 <ER>, such as might spell the word "there".

Figure 5:
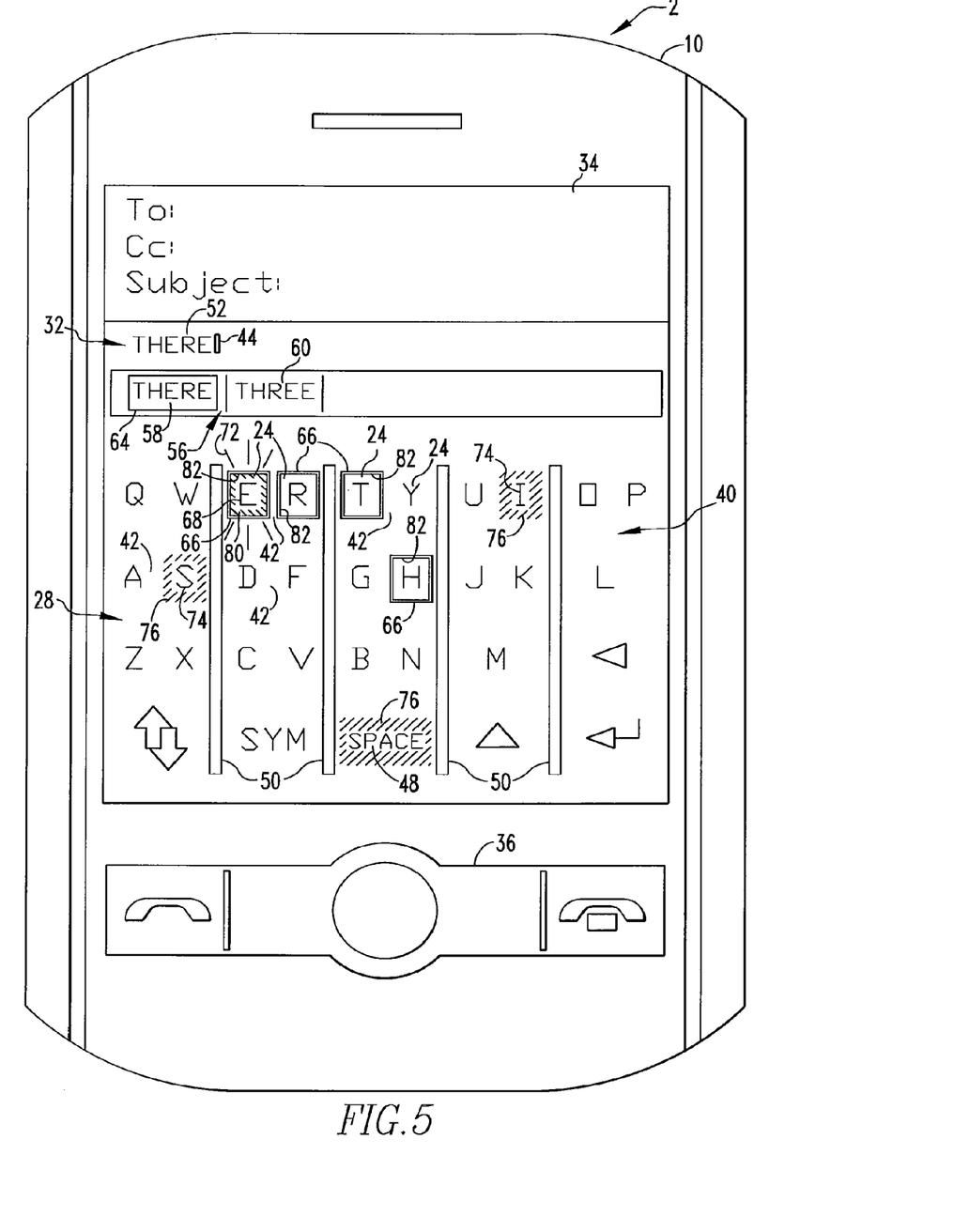
FIG. 5 is a view similar to FIG. 4 except depicting the handheld electronic device after still another input member actuation.

FIG. 5 is a view similar to FIG. 4, except depicting the result of an additional actuation of the virtual key 42 <ER>. The default output 58 in FIG. 5 has become the word "there" and thus the letter 24 "E" has become the current linguistic element 68 and second highlighting 72 has been applied thereto. It is further noted, however, that the letter 24 "E" further has fourth highlighting 80 applied thereto as is representative of the relative frequency with which the letter "E" appears in the default output 58. That is, the letter 24 "E" appears twice in the default output 58 "there", as compared with the other letters 24 in "there" which appear only once therein.

It can further be seen from FIG. 5 that the word "three" is a variant output 60 and is itself a complete word. Since a plurality of complete words, i.e., 'there" and "three", correspond with the string of input member actuations and each consist of a quantity of letters 24 equal to the number of input member actuations in the string, a fifth highlighting 82 is applied in the input portion 28 to the letters 24 of the default output 58. Such fifth highlighting 82 is represented in an exemplary fashion as an additional box drawn about such letters 24 to thereby represent in combination with the first highlighting 66 a double box around each letter 24 of the default output 58. Such fifth highlighting 82 could be of any nature whatsoever, whether applied to the letters 24 in the input portion 28 or highlighting applied elsewhere on the handheld electronic device 2. Such fifth highlighting 82 indicates to the user the existence of an alternative complete word as an alternative to the default output 58. In this regard, such fifth highlighting 82 may be provided automatically upon the identification of two complete words corresponding with the string of input member actuations, or can be contingent upon the frequency values of the two language objects 18 being above a predetermined threshold and/or the difference in frequency values being below another predetermined threshold.

While each of the letters 24 of the default output 58 are indicated in the input portion 28 as having the first highlighting 66 applied thereto simultaneously, it is noted that such first highlighting 66 and/or other highlighting could be applied in the input portion 28 on a sequential basis to the letters 24 of the default output 58. That is, in the example depicted in FIG. 5, the letter 24 "T" in the input portion 28 would have the first highlighting 66 applied thereto, followed by the letter 24 "H" in the input portion 28 having the first highlighting 66 applied thereto. Immediately subsequent would occur application of the first highlighting 66 to the letters 24 "T", "R", and "E" in that order. The handheld electronic device 2 could be configured to repeat the series of sequential application of first highlighting 66 in the input portion 28 to the letters 24 of the default output 58, if desired. Moreover, the handheld electronic device 2 could be set up such that only one of the letters 24 of the default output 58 would have the first highlighting 66 applied thereto at any one time, such as would result in an appearance of the first highlighting 66 being shifted from one letter 24 to the next in the default output 58. Alternatively, the first highlightings 66 of the letters 24 in the default output 58 could be cumulative, depending upon the desires and needs of the user.

It is further noted that such repetitive application of highlighting to the letters 24 in the default output 58 could occur at all times, or could be configured to occur only upon detecting a finalization input, such as could be provided by actuating the <SPACE> key 48. In the latter situation, upon detection of the finalization input, the first highlighting 66 would switch to the sequential type mentioned above, either once sequentially or repetitively sequentially until an additional input is detected. In the event of detecting a finalization input, the default output 58 is output at the text input component 52. Also, the string of input member actuations that resulted in the input of the aforementioned default output 58 would be cleared from memory to make room for additional input member actuations.

Figure 6:
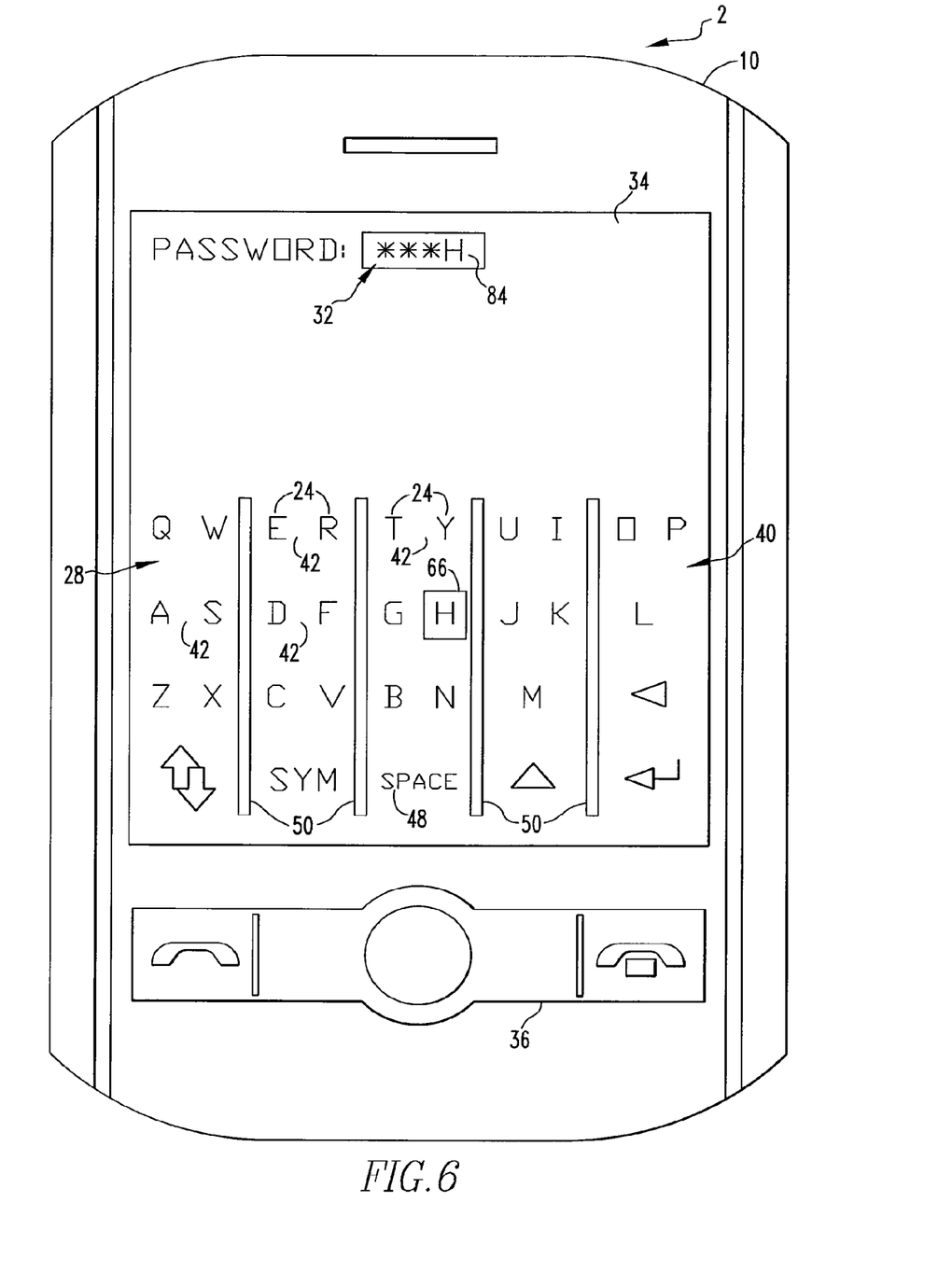
FIG. 6 is a view similar to FIG. 1, except depicting the handheld electronic device after a string of input member actuations when a focus of the handheld electronic device is on a password input field.

FIG. 6 depicts another aspect of the disclosed and claimed concept. Specifically, in some circumstances a focus of the processor apparatus 4 may be on a field of a particular type, such as a password input field 84. In such a situation, it may be desirable to suspend operation of the letter confirmation system or to provide only minimal confirmation of the letters 24 being input. FIG. 6 depicts a textual input entered in the password input field 84 with only a minimal, i.e., short duration, confirmation in the input portion 28 of each such input letter 24. For instance, FIG. 6 depicts the letter 24 "H" having first highlighting 66 applied thereto, and further depicts the letter 24 "H" being output within the password input field 84. The three asterisks preceding the letter 24 "H" represent three preceding letters 24 that were input as a result of three actuations of virtual keys 42. Such three input member actuations preceding input of the letter 24 "H" are each indicated generically by an asterisk in the password input field 84 but do not receive any sustained highlighting in the input portion 28. The first highlighting 66 applied to the letter 24 "H", or applied to any preceding letter 24, may appear for a duration on the order of one second or less, depending upon the needs of the user. Such a configuration thus advantageously provides a letter confirmation system but provides it only to a minimal extent to protect the privacy of the user while still providing confirmation of the input being provided to the password input field 84.

Figure 7:
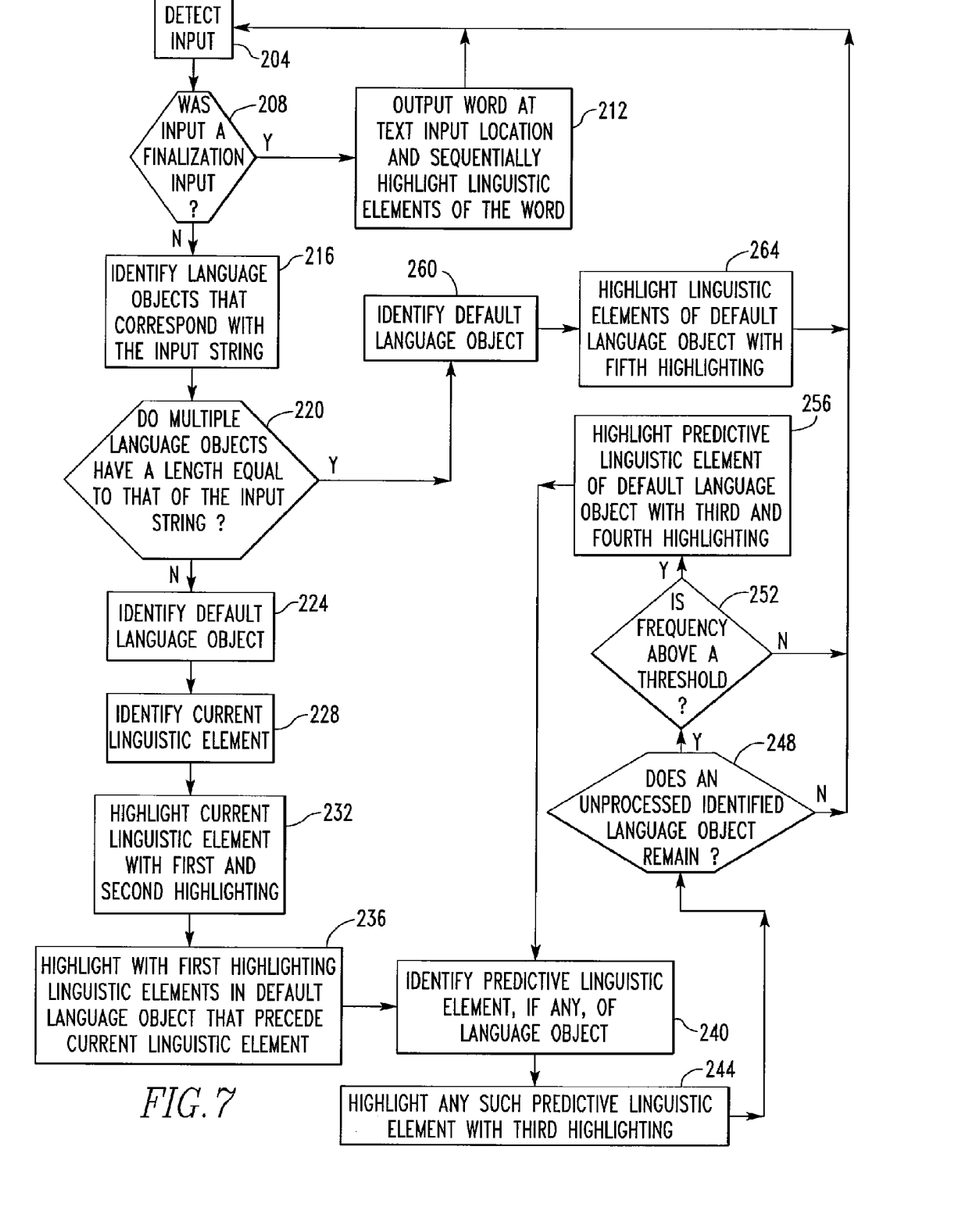
FIG. 7 is a flowchart depicting an exemplary method in accordance with the disclosed and claimed concept that can be executed on the handheld electronic device of FIG. 1.

An improved method in accordance with the disclosed and claimed concept that can be executed on the handheld electronic device 2 is depicted generally in FIG. 7. Processing begins with the detection of an input, as at 204. It is then determined, as at 208, whether the input was a finalization input, such as would result from an actuation of the <SPACE> key 48, an actuation of an <ENTER> key, a click actuation of a track wheel or a trackball, or an actuation of another finalization input member. If it is determined at 208 that the input was, in fact, a finalization input, processing continues, as at 212, where the default output 58 is output as a word at the text input location 52, and highlighting is applied in a sequential fashion in the input portion 28 to the letters 24 that correspond with the word in the text input location 52. Processing thereafter continues to 204 where additional input can be detected.

If, however, it is determined at 208 that the input was not a finalization input, processing continues, as at 216, where one or more language objects 18 that correspond with the input string are identified. In this regard, and as suggested above, a language object 18 having at least an initial portion of letters 24 that are consistent with the letters of the string of input member actuations is considered to correspond with the string of input member actuations, i.e., the input or the input string. It is then determined, as at 220, whether multiple language objects each have a length equal to that of the input string. If not, processing continues to 224 where a default language object 18 is identified from among the various language objects 18 that were identified at 216. The default language object 18 is, in the present exemplary embodiment, identified at 224 on the basis of having associated therewith a frequency object 20 having a relatively greatest frequency value when compared with the other identified language object 18 and their associated frequency objects 20.

Processing thereafter continues to 228 where a current linguistic element 68 is identified within the default language object 18. That is, a current input member actuation is an actuation of the most recently actuated virtual key 42. The letter 24 assigned to the most recently actuated virtual key 42 and which is consistent with a sequentially corresponding letter 24 in the default output 58 is the current linguistic element.

Processing thereafter continues to 232 where the current linguistic element 68 is highlighted with first and second highlighting 66 and 72. The first highlighting can, for example, be representative of the fact that the current linguistic element 68 is a letter 24 in the default output 58, and the second highlighting 72 can be representative, for instance, of the current linguistic element 68 being the most recently input letter 24. Processing thereafter continues to 236 where first highlighting 66 is applied to at least some of the preceding letters 24 of the default output 58, if any. In this regard, it is understood that the quantity of preceding letters 24 in the default output 58 to which such first highlighting 66 is applied can vary depending upon, for example, the frequency of typing by the user, a preset limit on the number of letters 24 which should receive highlighting, and the like.

Processing thereafter continues to 240 where a predictive linguistic element 74, if any, may be identified in the current language object 18. Thereafter, as at 244, any such predictive linguistic element 74 receives third highlighting 76.

Processing thereafter continues to 248 where it is determined whether or not any language objects 18 which were identified at 216 remain unprocessed, i.e., have not been evaluated to identify a predictive linguistic element 74 therein that desirably might be highlighted in the input portion 28. If at 248 any such unprocessed language object 18 is determined to remain, processing continues, as at 252, where it is determined whether or not the frequency value of the frequency object 20 associated with such a language object 18 is above a predetermined threshold. If the frequency is determined at 252 to be above such threshold, processing continues, as at 256, where the predictive linguistic element 74 of the default language object 18 or the next highest frequency language object 18 is redisplayed with third and fourth highlighting 76 and 80. That is, such a predictive linguistic element 74 is now being redisplayed additionally with fourth highlighting 80 indicative of a relatively high frequency of such predictive linguistic elements 74 based upon additional predictive linguistic elements 74 being identified in other language objects 18. Processing thereafter continues to 240 where the additional predictive linguistic element 74, if any, can be identified for possible output, as at 244.

It is noted that the frequency threshold analysis at 252 is purely optional, it being noted that low frequency predictive linguist elements 74 desirably might be suppressed from highlighting in the input portion 28 in order to avoid distraction. If the frequency is determined at 252 to not be above the threshold, processing continues, as at 204, where additional input can be detected. Similarly, if it is determined at 248 that no unprocessed identified language objects remain, process continues, as at 204, where additional input can be detected.

If it is determined at 220 that multiple language objects 18 do, in fact, have a length equal to that of the input string, processing continues, as at 260 where a default language object 18 is identified, typically on the basis of a relatively highest frequency value. Processing thereafter continues to 264 where the linguistic elements of the default language object receive, in the input portion 28, fifth highlighting 82. It is understood, however, that such fifth highlighting 82 could be provided in other fashions and in other locations without departing from the disclosed concept.

It thus can be seen that the instant letter confirmation system advantageously facilitates text input by providing confirmation of letters being input on the handheld electronic device 2, as is reflected in a default output 58. The letter confirmation system further facilitates text input by providing predictive linguistic elements 74 that would be appropriate next inputs. It is reiterated that the various exemplary highlighting techniques depicted and described herein can be replaced with numerous other types of highlighting. It is further noted that changes in highlighting can occur either transitionally, i.e., gradually, or can occur in a more abrupt fashion, depending upon the needs of the user. For instance, when a given highlighting changes from an initial highlight to a default highlight, such change can either occur abruptly between the initial and default highlights, or can gradually shift between the initial and default highlights depending upon the needs of the user, without departing from the present concept.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. An input method for a user device comprising a processor, a memory, and a keyboard including a plurality of keys, the method comprising:
   detecting an ambiguous input comprising a number of key selections;
   identifying linguistic elements corresponding to the key selections;
   identifying a default language object having at least an initial portion that corresponds with at least a portion of the identified linguistic elements;
   highlighting keys on the keyboard corresponding to the default language object with a first highlighting;
   identifying at least one predictive linguistic element for the default language object; and
   highlighting on the keyboard the at least one predictive linguistic element using a second highlighting.

2. The method of claim 1, further comprising highlighting the linguistic element of a current key selection with a third highlighting to distinguish the current key selection from the highlighted keys corresponding to the default language object.

3. The method of claim 2, wherein the predictive linguistic element is positioned in the language object at a location adjacent and subsequent to a current linguistic element corresponding to the current key selection.

4. The method of claim 2, further comprising:
   identifying, for each successive key selection of the input as the current key selection, a default language object having at least an initial portion that corresponds with the linguistic elements of the input; and
   when the default language object is a different language object than that which was identified as a preceding default language object, highlighting keys on the keyboard corresponding to the different language object with the first highlighting.

5. The method of claim 4, further comprising identifying at least one predictive linguistic element for the different language object, and highlighting on the keyboard the at least one predictive linguistic element using a third highlighting.

6. The method of claim 1, further comprising:
   determining that a focus of the input is on a password input field; and
   responsive to each key selection of the input, providing a temporary highlighting of the linguistic element assigned to the key followed by an absence of highlighting of the linguistic element.

7. The method of claim 1, further comprising highlighting on the keyboard a plurality of linguistic elements corresponding to the default language object, wherein the first highlighting is applied on the keyboard on a sequential basis according to an order of the input.

8. The method of claim 1, further comprising:
   detecting a finalization input;
   outputting at a text input location on an output portion a word corresponding with the input; and
   sequentially highlighting on the keyboard the linguistic elements corresponding with the word.

9. An electronic device comprising:
   a memory storing instructions;
   a keyboard including a plurality of keys; and
   a processor executing the instructions to perform the steps of:
   detecting an ambiguous input comprising a number of key selections;
   identifying linguistic elements corresponding to the key selections;
   identifying a default language object having at least an initial portion that corresponds with at least a portion of the identified linguistic elements;
   highlighting keys on the keyboard corresponding to the default language object with a first highlighting;
   identifying at least one predictive linguistic element for the default language object; and
   highlighting on the keyboard the at least one predictive linguistic element using a second highlighting.

10. The electronic device of claim 9, the processor executing the instructions to perform the further step of highlighting the linguistic element of a current key selection with a third highlighting to distinguish the current key selection from the highlighted keys corresponding to the default language object.

11. The electronic device of claim 10, wherein the predictive linguistic element is positioned in the language object at a location adjacent and subsequent to a current linguistic element corresponding to the current key selection.

12. The electronic device of claim 10, the processor executing the instructions to perform the further steps of:
   identifying, for each successive key selection of the input as the current key selection, a default language object having at least an initial portion that corresponds with the linguistic elements of the input; and
   when the default language object is a different language object than that which was identified as a preceding default language object, highlighting keys on the keyboard corresponding to the different language object with the first highlighting.

13. The electronic device of claim 12, the processor executing the instructions to perform the further step of identifying at least one predictive linguistic element for the different language object, and highlighting on the keyboard the at least one predictive linguistic element using a third highlighting.

14. The electronic device of claim 9, the processor executing the instructions to perform the further steps of:
   determining that a focus of the input is on a password input field; and
   responsive to each key selection of the input, providing a temporary highlighting of the linguistic element assigned to the key followed by an absence of highlighting of the linguistic element.

15. The electronic device of claim 9, the processor executing the instructions to perform the further step of highlighting on the keyboard a plurality of linguistic elements corresponding to the default language object, wherein the first highlighting is applied on the keyboard on a sequential basis according to an order of the input.

16. The electronic device of claim 9 the processor executing the instructions to perform the further steps of:
   detecting a finalization input;
   outputting at a text input location on an output portion a word corresponding with the input; and
   sequentially highlighting on the keyboard the linguistic elements corresponding with the word.

17. A tangibly embodied non-transitory computer-readable storage medium storing instructions that, when executed by a processor, perform a method comprising:
   detecting an ambiguous input comprising a number of key selections from a keyboard including a plurality of keys;
   identifying linguistic elements corresponding to the key selections;
   identifying a default language object having at least an initial portion that corresponds with at least a portion of the identified linguistic elements;
   highlighting keys on the keyboard corresponding to the default language object with a first highlighting;
   identifying at least one predictive linguistic element for the default language object; and
   highlighting on the keyboard the at least one predictive linguistic element using a second highlighting.

18. The computer-readable storage medium of claim 17, the method further comprising highlighting the linguistic element of a current key selection with a third highlighting to distinguish the current key selection from the highlighted keys corresponding to the default language object.

19. The computer-readable storage medium of claim 18, wherein the predictive linguistic element is positioned in the language object at a location adjacent and subsequent to a current linguistic element corresponding to the current key selection.

20. The computer-readable storage medium of claim 18, the method further comprising:
   identifying, for each successive key selection of the input as the current key selection, a default language object having at least an initial portion that corresponds with the linguistic elements of the input; and
   when the default language object is a different language object than that which was identified as a preceding default language object, highlighting keys on the keyboard corresponding to the different language object with the first highlighting.

21. The computer-readable storage medium of claim 20, the method further comprising identifying at least one predictive linguistic element for the different language object, and highlighting on the keyboard the at least one predictive linguistic element using a third highlighting.

22. The computer-readable storage medium of claim 17, the method further comprising:
   determining that a focus of the input is on a password input field; and
   responsive to each key selection of the input, providing a temporary highlighting of the linguistic element assigned to the key followed by an absence of highlighting of the linguistic element.

23. The computer-readable storage medium of claim 17, the method further comprising highlighting on the keyboard a plurality of linguistic elements corresponding to the default language object, wherein the first highlighting is applied on the keyboard on a sequential basis according to an order of the input.

24. The computer-readable storage medium of claim 17, the method further comprising:
   detecting a finalization input;
   outputting at a text input location an output portion a word corresponding with the input; and
   sequentially highlighting on the keyboard the linguistic elements corresponding with the word.

* * * * *